United States Patent
Yamamoto et al.

[11] 3,800,982
[45] Apr. 2, 1974

[54] METERED LIQUID DISPENSER

[75] Inventors: Ichizo Yamamoto; Hiroshi Fujii, both of Tokyo, Japan

[73] Assignee: Oval Kiki Kogyo Kabushiki Kaisha, Tokyo, Japan

[22] Filed: Sept. 28, 1972

[21] Appl. No.: 293,072

[30] Foreign Application Priority Data
June 20, 1972 Japan.............................. 47-60952

[52] U.S. Cl..................................... 222/20, 222/76
[51] Int. Cl........................................... B67d 5/30
[58] Field of Search............ 222/14, 16, 17, 18, 19, 222/20, 40, 59, 60, 70, 71, 76

[56] References Cited
UNITED STATES PATENTS
3,097,762  7/1963  Charnota et al...................... 222/20
3,583,220  6/1971  Kawakami......................... 73/229 X
3,088,315  5/1963  Withers............................. 222/14 X
3,248,583  4/1966  Kullmann............................. 310/104
2,872,072  2/1959  Reed.................................. 222/70 X
2,060,674  11/1936  Hicks............................. 222/14 UX

*Primary Examiner*—Stanley H. Tollberg
*Assistant Examiner*—Joseph J. Rolla

[57] ABSTRACT

A liquid distributor adapted in an automatic selling machine, comprises a vertical wall on which a plurality of units are fixed. Each of units has a positive displacement flow meter, an automatic valve and other means necessary for supplying, exhausting and mixing such several kinds of liquid as to drink which is discharged from a single nozzle to be sold by the glass or cup, of which amount and mixed ratio of liquid is exactly measured by the flow meter automatically and supplied very sanitarily.

7 Claims, 5 Drawing Figures

METERED LIQUID DISPENSER

BACKGROUND OF THE INVENTION

This invention relates to an apparatus for distributing liquid, more particularly to an apparatus for distributing liquid adapted to an automatic selling machine for selling at retail such liquid as mixed with several kinds of liquid.

The automatic selling machine for selling in small quantities some kinds of liquid separately or mixing it, for example, a glass of refreshment of which basic liquor is diluted properly, has been generally used. However, one such machine as prevailed has adapted a mechanism in which each liquid is supplied all together within a certain period of time controlled by a timer switch so that the quantity of liquid to be supplied, may be a certain definite value. In another mechanism, each liquid is measured by a measure or by a piston before it is supplied. So, in one machine the accuration of measurement was not exact, or in the other one, the mechanism was so complex that the cost was expensive.

SUMMARY OF THE INVENTION

It is, accordingly, a general object of the present invention to provide an improved machine for distributing liquid which is not possessed of the above disadvantages.

More particularly, it is an object of the present invention to provide an improved device for distributing liquid adapted to an automatic selling machine by which it can sell in small quantities of liquid measured exactly and of which manufacturing cost is low. Namely, it is an object of the present invention to provide an improved device for distributing liquid adapted to an automatic selling machine in small quantities measured accurately having very narrow space to arrange the low cost and sanitary machine for distributing liquid, using a compact positive displacement flow meter by which measured quantity of liquid is accurate.

The novel features which are considered as characteristic for the invention are set forth in particular in the appended claims. The invention itself, however, both as to its construction and its method of operation together with additional objects and advantages thereof, will be best understood from the following description of specific embodiments when read in connection with the accompanying drawings.

DESCRIPTION OF THE PREFERRED EMBODIMENT

Discussing the drawings in detail, it will be seen that the apparatus for distributing liquid according to the present invention has a vertical wall common to all units as shown in FIGS. 1 – 4 to which a plurality of units comprising all parts arranged in each unit, are fixed.

Figure 2:
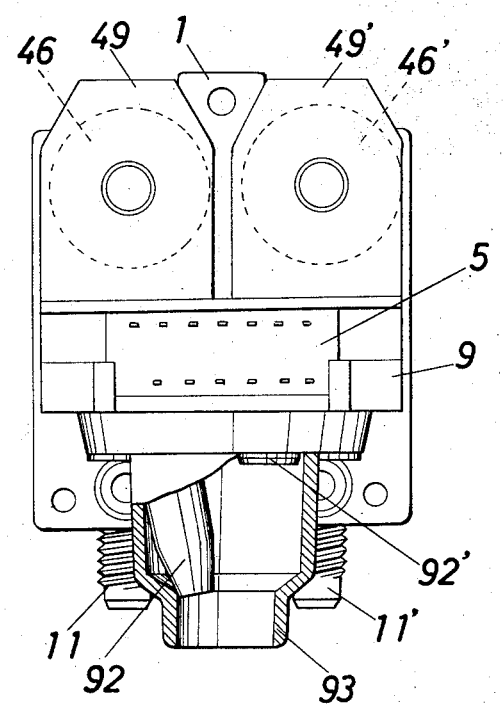
FIG. 2 is the right side view of the apparatus partially broken of FIG. 1.
Figure 3:
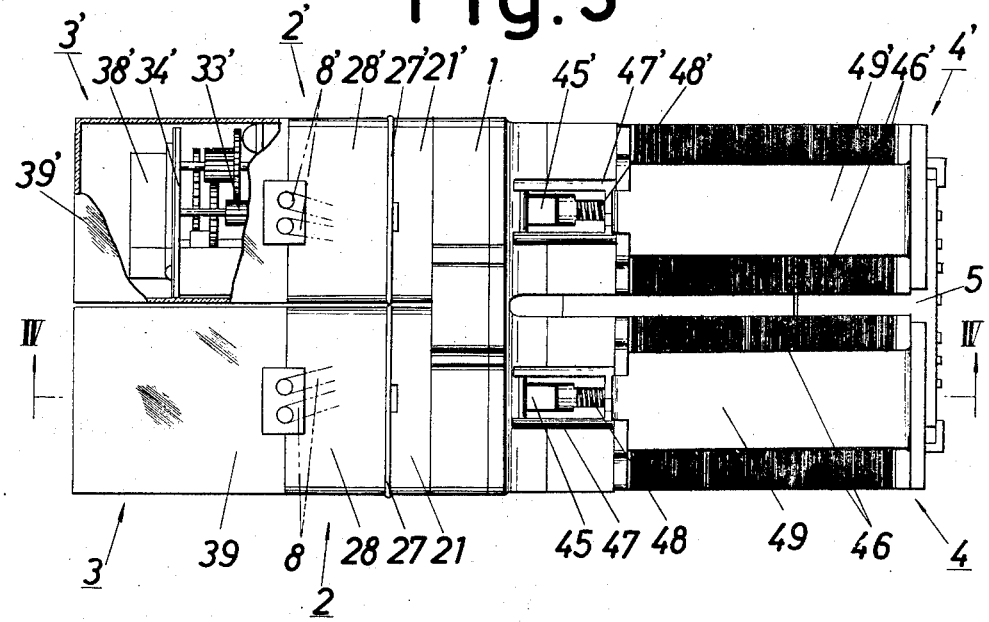
FIG. 3 is a top-plan view of the apparatus partially borken of FIG. 1.
Figure 5:
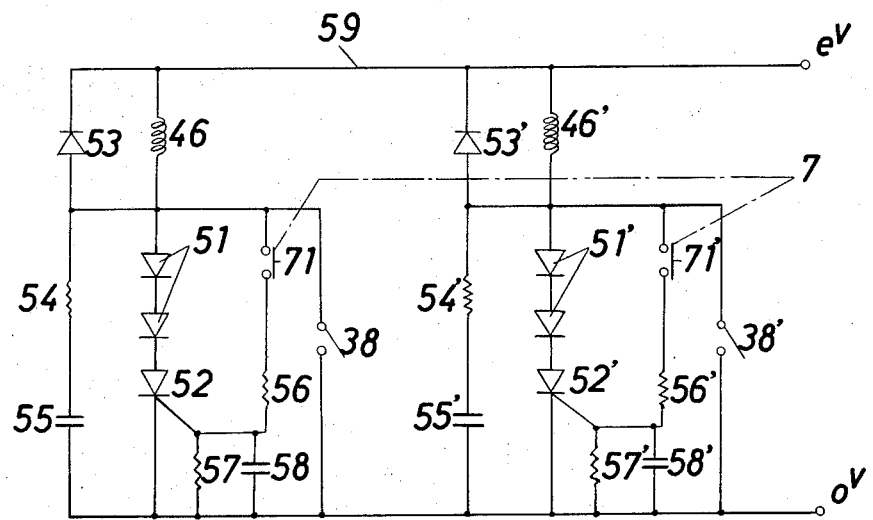
FIG. 5 is a block diagram showing the controlling circuit of the apparatus.

In FIGS. 2, 3 and 5, a pair of units are shown and the parts in one unit are denoted by unprimed numerals while the parts of the other unit are denoted by primed numerals.

The parts of one unit denoted by the same numerals as the other unit, have generally similar construction to each other. So, hereinafter, the embodiment will be explained of one unit for convenience of explanation, except for a vertical wall 1, a controller 5, a cable 6, a push button switch 7, a body of distributer 9, an electrical line for common use 59, and an outlet nozzle 93 which are common to all the units. The numeral 2 denotes a measuring chamber fixed to the vertical wall I; the numeral 3 denotes a counting system of the positive displacement flow meter; the numeral 4 denotes an automatic valve for the positive displacement flow meter; the numeral 5 denotes a controller; the numeral 6 denotes a cable connected to an electric power source; the numeral 7 denotes a push button switch; the numeral 8 denotes a cable for transmitting output from the flow meter; the numeral 9 denotes a part for a distributing passage; the numeral 11 denotes a connecting portion of the pipe for connection to a supply liquid source; the numeral 12 and 13 denote passages for introducing liquid; the numeral 14, 15 and 16 denote intermediate passages. In the embodiment, on one side of the vertical wall is formed the measuring chamber 2 of a flow meter through O-shaped sealing rings 17, 18 and on the other side, the automatic valve 4 is fixed.

The positive displacement of the flow meter having a measuring chamber 2, is shown as a flow meter having a pair of oval gear rotors, which comprises a vertical plate 21, formed with an inlet and an outlet (not shown in drawings); a short shaft 22, and a long shaft 23 horizontally extend from the vertical plate 21; a first oval rotary gear 24 and a second oval rotary gear 25 are rotatably mounted on the shafts 22, 23 respectively; an oval flat permanent magnet 26 inserted in and fixed to a slot formed on the end portion of the first rotor 24; enclosed within a pressure vessel 28 covered with a thin stainless steel liner 27 on the inside surface thereof and sealed to the plate 21 via an O-shaped sealing ring 29 and a fixing bolt (not shown).

A counting mechanism 3 included in a housing 39 is fixed to the measuring chamber 2, and consists of a permanent magnet 31, which forms a magnetic coupling together with the oppositely provided permanent magnet 26, inserted in an aperture 30 formed in the pressure vessel 28; a shaft 32 rotatably supports the permanent magnet 31; a system of reduction gears 33 are supported by frames 34 and 35; a shaft 36 is arranged below to support one of the reduction gears; a cam 37 is fixed to the shaft 36; and a micro switch 38 which is switched "on and off" by the cam 37 and the signals therefrom are transmitted to the controller 5 through the cable 8.

For an automatic valve 4, in this embodiment, a solenoid valve is used which consists of a main portion 40 of the valve fixed to the vertical wall 1 and includes a passage 41 for exhausting liquid and which is formed in the main portion of the valve, a valve seat 42 is arranged on the end of the passage 41, a valve plug 43 which is opened and closed by the valve 4 and which controls liquid flow through the passage 41 by contacting with and parting from the valve seat 42, a valve rod 45 which makes the valve plug 43 contact with and part from the valve seat 42 through an annular sealing part 44, a solenoid coil 46 controlled by the controller 5 and the push button switch 7. A rod 47 operates the valve plug 43 by means of reciprocal movement within the solenoid coil 46, and a spring 48 helps the above operation; and a yoke 49 supports the solenoid coil 46.

The controller 5 comprises a controlling circuit as shown in FIG. 5, being connected with a D.C. power source through the cable 6, the push button switch 7 and the micro switch 38. The control circuit comprises the following parts:

namely, a contact 71 of the push button switch 7; a normally open contact 38 of the micro switch; a solenoid coil 46; first diodes 51, 51; a silicon controlled rectifier element 52; a second diode 53; a first resistance 54; a first condenser 55; a second resistance 56; a third resistance 57; a second condenser 58 and a common line 59.

Figure 1:
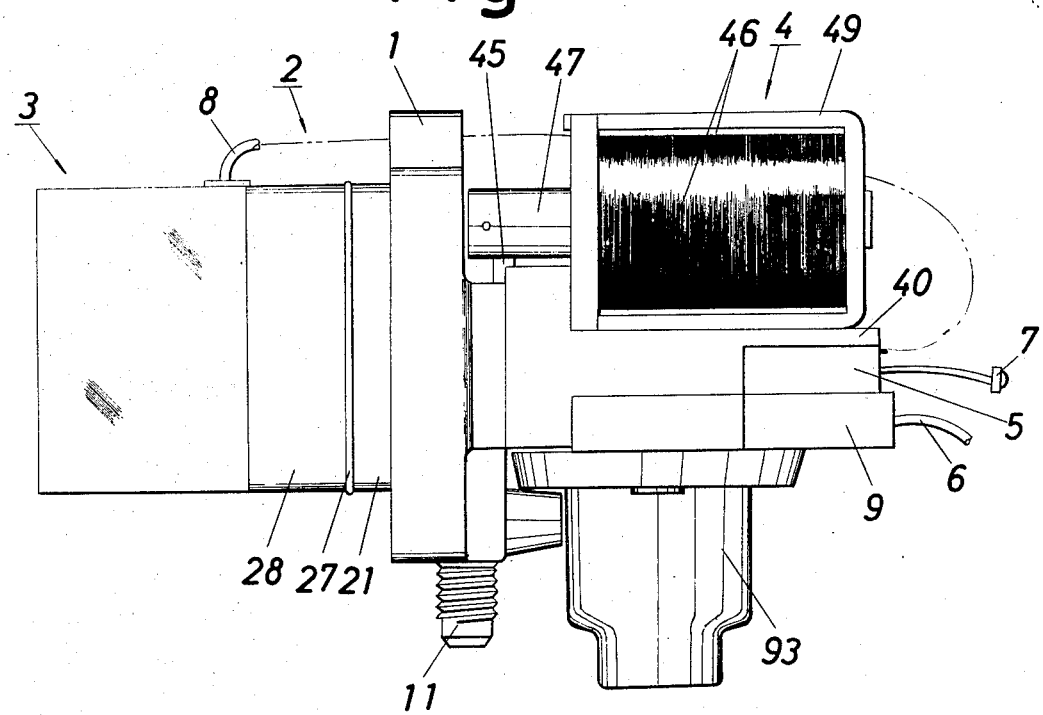
FIG. 1 is a front view of an apparatus for distributing liquid according to an embodiment of the invention.
Figure 4:
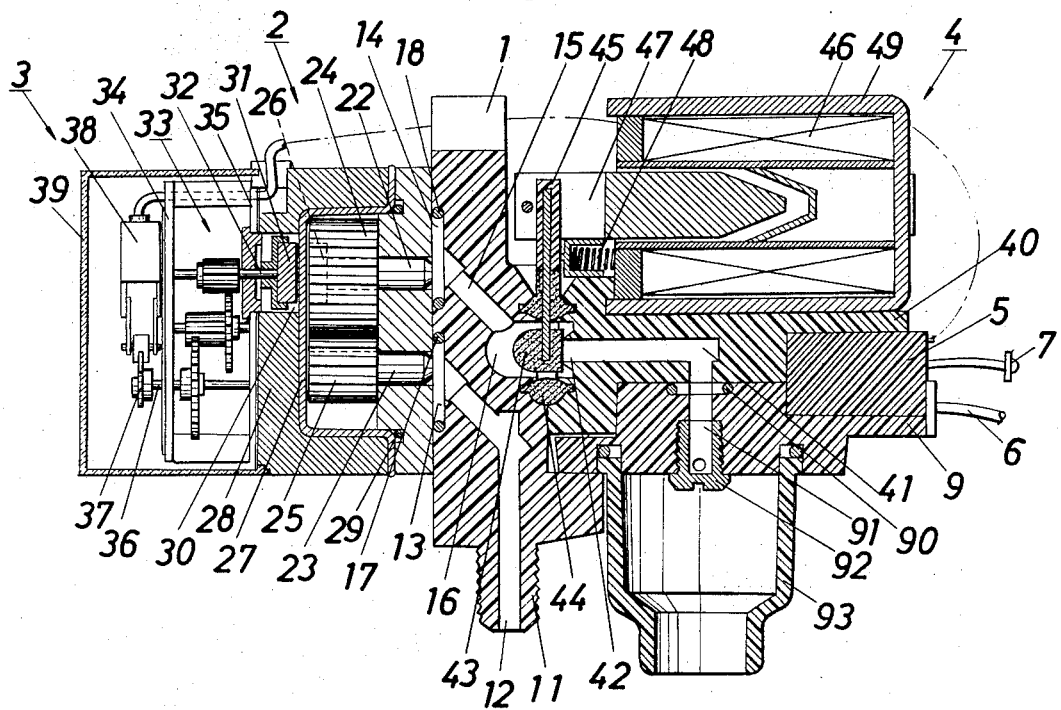
FIG. 4 is a longitudinal sectional view cut along the line IV — IV in FIG. 3

In FIGS. 1, 2 and 4, the numeral 9 denotes a main body 9 which is common to all units to form a distributing outlet passage and the main body 9 comprises for each unit a discharging passage 91; a sprinkler 92, and the nozzle 93 which is common to all units, and is fixed to the main body of the valve 40 via the O-shaped sealing ring 90.

As above mentioned, the parts of one unit having the same numerals as those of the other unit, are generally similar to each other in their constructions and number, except for the vertical frame 1, the controller 5, the cable 6 connected to an electric power source, the push button switch 7, the main body 9 to form the mixed liquid distributing passage, the nozzle 93 and the common line 59 which are common to all units. However, such element as the positive displacement flow meter 2 of one unit is not always necessarily similar to that of the other unit in its type or capacity and its number, for example, instead of a pair of rotors, a rotary piston or other type of flow meter can be employed in the other unit; further, for the automatic valve, instead of a solenoid, an air pressure valve can be used; and for the signal or the circuit instead of using electricity, an air pressure device can be employed. Beside, the flow meter and the automatic valve can be arranged alongside on one side of the vertical wall 1 which can, if desired, be divided into several parts for providing one part of wall with each unit and further, a throttle valve for controlling the flow rate can be provided in each intermediate passage 12 and 15.

As above mentioned, in the liquid discharging device having the said construction, a liquid supplying pipe is connected at the connecting portion 11. By pushing the push button switch 7, the contact 71 is closed so that the solenoid coil 46 may be energized to attract the rod 47 and move the value plug 43 away from the valve seat by which the liquid supplied through the liquid supplying pipe is led to the measuring chamber of the flow meter through the passages 12 and 13 and through the inlet (not shown) of the vertical plate 21 and rotates the engaged rotors so that the liquid may pass through the outlet (not shown) formed in the vertical plate 21 and through the intermediate passages 14, 15 and 16 and through the distributing passages 41 and 91 and may be exhausted from the nozzle 93 after the various kinds of liquid have been mixed therein.

While the push button switch 7 is pressed to close the contact 71, the silicon controlled rectifier element 52 is ignited and energized, so, in case the contact 71 is opened, the solenoid coil 46 is kept in the energized mode.

The rotary movement of the rotor 24 produced by the flowing liquid is transmitted through the magnetic coupling formed between the permanent magnets 26 and 31, to outside of the measuring chamber and reduced by the reduction gears 33 so as to rotate the cam 37 and immediately close the contact of the micro switch 38. Then, the silicon controlled rectifier element 52 is shorted and deenergized, but the solenoid coil 46 remains in the energized mode due to the contact 38 of the micro switch being closed.

When the quantity of liquid discharged into the chamber reaches a desired amount, the cam 37 has rotated to its initial or start position, and the contacts of the micro switch 38 are opened, opening the controlling circuit and deenergizing the solenoid coil 46 so that the rod 47 is removed by the operation of the spring 48 from the solenoid coil 46 and the valve plug 43 reseats on the valve seat 42 to stop the liquid flowing.

For repeating the operation, the push button switch 7 is pressed again to rotate the cam 37. The amount of liquid corresponding to one rotation of the cam 37, is discharged during each operation after being mixed in the nozzle 93 with the other kind of liquid discharged from the other unit.

At the same time that the desired amount of liquid has passed through each positive displacement flow meter 3, the cam 37 is controlled so as to finish one complete rotation, which is also controlled by selection of the reduction ratio of the reduction gears and the proper size of the measuring chamber. For the same object of obtaining the desired amount of liquid when the cam 37 has completed one complete rotation, if necessary, a device to control the flow rate from the sprinkler or a flow controller in the intermediate passage 15 may be arranged so that the necessary time of discharge from each unit may be coordinated with each other.

The construction and operation of the liquid distributor of the present invention is described as above and also, the advantages and effectiveness of the present embodiment will be made clear.

As the amount of liquid to be distributed is measured by a compact and precise positive displacement flow meter, it is measured precisely; the reduction ratio of the reduction gears 33 can be easily changed; as the amount of liquid corresponding with a certain integral number of rotations of the cam 37 instead of one rotation of the same, can be easily controlled by adding any well known logic circuit to the controlling circuit, the discharging capacity and the mixing ratio of different kinds of liquid can be freely changed each discharge period without any liquid remaining in the chamber so that the present liquid distributor is also useful for soft drinks, and ideal for being adapted for an automatic selling machine which has a limited space therein.

While the invention has been illustrated and described as embodied in a liquid distributor, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptions should and are intended to be comprehended within the meaning and range of equivalents of the following claims.

What is claimed as new and desired to be protected by letters Patent is set forth in the appended claims.

1. A liquid dispensing device comprising a vertical wall having a first passageway for receiving a liquid and conveying same to one side of the wall and a second passageway for conveying the liquid from the one side to the opposite side of the wall, a positive displacement flow meter mounted on said wall and coupled to said first passageway to receive the liquid and after passage through the flow meter to return said liquid to the second passageway, said flow meter including rotors actuable by the flowing liquid and rotating an amount in proportion to the quantity of the liquid passing through the flow meter, means coupled to the rotors for generating a signal each time the volume of flowing liquid reaches a predetermined value and integer multiples of said predetermined value, an outlet for the liquid to be dispensed, a third passageway connecting the second passageway to the outlet, valve means in the third passageway, means for opening the valve means to allow the liquid to be dispensed through the outlet, and means actuable by the generated signal for closing the valve means upon receipt of a predetermined number of the said signals.

2. A device as claimed in claim 1 wherein said flow meter comprises a pressure vessel which houses rotors actuable by said flowing liquid, at least one permanent magnet on the rotors, and means for magnetically coupling to said permanent magnet to provide external of the pressure vessel a rotary motion related to the flowing liquid.

3. A device as claimed in claim 2 wherein said flow meter has a pair of rotors, said permanent magnet is mounted on one of said pair of rotors, said rotors having on its peripheral edges teeth which engage each other.

4. A device for dispensing plural liquids, comprising a vertical wall, a first unit for dispensing a first liquid and at least a second unit corresponding to the first for dispensing a second liquid, said first and second units being mounted on the said vertical wall; said vertical wall having a first passageway for receiving a first liquid and conveying same to one side of the wall and a second passageway for conveying the first liquid from the one side to the opposite side of the wall; said first unit including a first positive displacement flow meter mounted on said wall and coupled to said first passageway to receive the first liquid and after passage through the flow meter to return said first liquid to the second passageway, said first flow meter including rotors actuable by the flowing first liquid and rotating an amount in proportion to the quantity of the first liquid passing through the flow meter, means coupled to the rotors for generating a first signal each time the volume of flowing liquid reaches a predetermined value and integer multiples of said predetermined value; an outlet for the liquid to be dispensed, a third passageway connecting the second passageway to the outlet; said first unit including first valve means in the third passageway, means for opening the first valve means to allow the first liquid to be dispensed through the outlet, and means actuable by the generated first signal for closing the first valve means upon receipt of a predetermined number of the said first signals; said second unit including a second positive displacement flow meter corresponding to the first flow meter, second signal generating means corresponding to the first signal generating means, second valve means corresponding to the first valve means, and second valve closing means corresponding to the first valve closing means, said first valve opening means also being connected to said second valve means for opening same simultaneously with opening of the first valve means, a fourth passageway in the wall for conveying the second liquid to the second flow meter, a fifth passageway in the wall for conveying the second liquid after passage through the second flow meter to the opposite side of the wall, and a sixth passageway connecting the fifth passageway to an outlet, said second valve means being located within the sixth passageway, whereby the respective quantities of the first and second liquids conveyed to the outlet is separately controllable by a preset integral number of revolutions of the rotors in the respective flow meters through which the respective liquids are passed.

5. A device as claimed in claim 4 wherein the first and second valve means are both mounted on the vertical wall.

6. A device as claimed in claim 5 wherein said valve means includes a solenoid for closing and opening same, and the valve closing means comprises a microswitch actuable by the flow meter and a circuit including a D.C. power source common to all units, one end of the coil of the solenoid being connected to the positive side of the D.C. power source, at least a first diode having its anode connected to said one end of said solenoid coil, a silicon controlled rectifier element connected in series with said diode, a line common to all units through which the cathode of said controlled rectifier is connected to the negative side of said D.C. power source, a second diode which is connected in parallel with the coil, a first resistor and a first condensor connected in series with each other and in parallel with the controlled rectifier and the first diode, means for connecting the microswitch between the common line and the said one end of the solenoid coil, a push button switch common to all units, a second resistor connected in series with the push button switch between said one end of the coil and the gate electrode of said controlled rectifier, and a third resistor and a second condenser connected in parallel between the gate electrode of the controlled rectifier and the common line.

7. A device as claimed in claim 4 wherein the outlet is common to all units whereby plural liquids can be discharged through the common outlet.

* * * * *